M. VON ROHR.
ACHROMATIC SPECTACLE GLASS.
APPLICATION FILED JULY 15, 1909.

968,693.

Patented Aug. 30, 1910.

Witnesses:
Paul Krüger
Fritz Sander

Inventor:
Moritz von Rohr

UNITED STATES PATENT OFFICE.

MORITZ VON ROHR, OF JENA, GERMANY, ASSIGNOR TO THE FIRM OF CARL ZEISS, OF JENA, GERMANY.

ACHROMATIC SPECTACLE-GLASS.

968,693.  Specification of Letters Patent.  Patented Aug. 30, 1910.

Application filed July 15, 1909. Serial No. 507,769.

*To all whom it may concern:*

Be it known that I, MORITZ VON ROHR, a citizen of the German Empire, and residing at Carl-Zeiss strasse, Jena, in the Grand Duchy of Saxe-Weimar, Germany, have invented a new and useful Achromatic Spectacle-Glass, of which the following is a specification.

The invention relates to the powerful collective spectacle glasses required for aphacic eyes and particularly to those which are, for the purpose of chromatic correction, cemented or fused together of a front biconvex crown glass lens and a hinder planoconcave flint glass lens, of which latter the hinder plane surface may be replaced by a cylindrical surface for correcting an astigmatic defect of the eye. Achromatic spectacle glasses of this description, as are hitherto known, show coarse astigmatic aberrations, when their marginal parts are made use of. These aberrations are capable of being removed, although the hinder surface must be a plane one and the curvature of the front surface is nearly fixed by the required power of the spectacle glass. The investigations upon which the invention is based have proved, that the great variety of the available kinds of crown and flint glass allows of realizing such astigmatic correction, without neglecting the chromatic one, for the whole region between 10 and 18 dioptries, to which the powers of spectacles for aphacic eyes in the main are restricted. For both corrections there is, as is well known, a small hinder diaphragm to be supposed in the center of rotation of the eye, *i. e.*, about 3 cm. distant from the spectacle glass.

Figure 1:
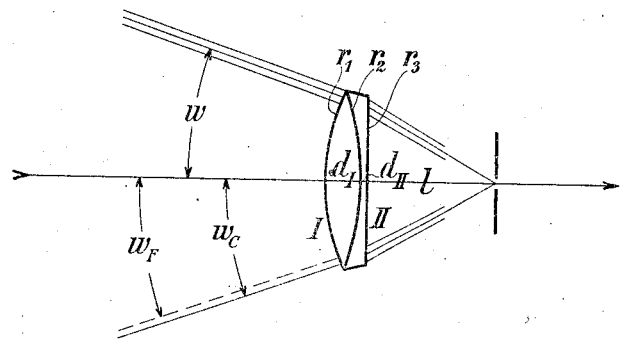
Figure 2:
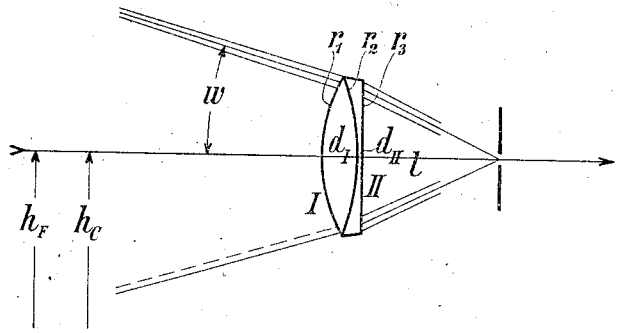

In the accompanying drawing: Figure 1 is an axial section through an anastigmatic and achromatic spectacle glass constructed according to the invention to correct an aphacic eye for distance. Fig. 2 is an axial section through an anastigmatic and achromatic spectacle glass constructed according to the invention to correct an aphacic eye for reading.

In both spectacle glasses shown in these figures any astigmatic defect of the eye is left out of consideration. For this reason either glass is shown as equipped with a plane hinder surface in lieu of a cylindrical one. For each example a table is given below, which contains, besides the statements as to the power of the spectacle glass and the kinds of glass used for it, the numerical values of the linear dimensions indicated in the figures, also the angles of inclination $w_C$ and $w_F$ of the red and blue components, which on the object side correspond to the principal ray on the image side selected for achromatization, or instead of these angles the distances $h_C$ and $h_F$ between the axis and the places, in which these components impinge on the object plane, then the angles of inclination $w$ of the three principal rays on the object side and the intersection distances $s'_s$ and $s'_t$ of the sagittal and meridional pencils appertaining to the same principal rays on the image side, *i. e.*, the distances between the exit places of the pencils and their places of intersection.

*Fig. 1.*

Focal length 91.02 mm. Power 11 dioptries. Objects far distant.

$n_{DI}=1.51633$   $\nu_1=64.1$   $n_D=1.60291$   $\nu_{II}=38.1$
$r_1=40.92$ mm.   $r_2=50.0$ mm.   $r_3=\infty$
$d_I=7.0$ "   $d_{II}=1.0$ "   $l=25.0$ mm.

$w_C=19°.353$   $w_F=19°.352$ $w=0°$              13°.481        19°.347
$s'_s=85.09$ mm.    87.84 mm.      92.10 mm.
$s'_t=85.09$ "      86.13 "        94.45 "

*Fig. 2.*

Focal length 69.04 mm. Power 14.5 dioptries. Plane object at right angles to the axis and at a distance of 315 mm. from the lens.

$n_{DI}=1.51687$   $\nu_1=64.1$   $n_{DII}=1.59633$   $\nu_{II}=39.6$
$r_1=31.93$ mm.   $r_2=43.21$ mm.   $r_3=\infty$
$d_I=7.0$ mm.   $d_{II}=0.5$ mm.   $l=25.0$ mm.

$h_C=109.34$ mm.   $h_F=109.13$ mm.

$w=0°$              11°.370        16°.343
$s'_s=82.95$ mm.    84.81 mm.      88.34 mm.
$s'_t=82.95$ "      82.57 "        92.06 "

I claim:

An achromatic collective spectacle glass for an aphacic eye, consisting of two lenses closely joined together, a biconvex collective lens and a dispersive lens, the free surface of the dispersive lens having at least in one direction the curvature zero and the spectacle glass being corrected for astigmatism with regard to a small diaphragm placed at about 3 cm. distance from the free surface of the dispersive lens.

MORITZ VON ROHR.

Witnesses:
  PAUL KRÜGER,
  FRITZ LANDER.